United States Patent
Nakano

(10) Patent No.: US 12,013,181 B2
(45) Date of Patent: Jun. 18, 2024

(54) ELECTRODE SHEET DRYING APPARATUS

(71) Applicant: TOYOTA JIDOSHA KABUSHIKI KAISHA, Toyota (JP)

(72) Inventor: Takahiko Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/461,576

(22) Filed: Sep. 6, 2023

(65) Prior Publication Data

US 2023/0417484 A1 Dec. 28, 2023

Related U.S. Application Data

(63) Continuation of application No. 17/228,787, filed on Apr. 13, 2021, now Pat. No. 11,788,789.

(30) Foreign Application Priority Data

Jun. 3, 2020 (JP) .................... 2020-096701

(51) Int. Cl.
  *F26B 3/04* (2006.01)
  *F26B 15/18* (2006.01)
  *H01M 4/04* (2006.01)

(52) U.S. Cl.
  CPC ............. *F26B 3/04* (2013.01); *F26B 15/18* (2013.01); *H01M 4/0471* (2013.01)

(58) Field of Classification Search
  CPC .......... F26B 3/04; F26B 15/18; H01M 4/0471
  USPC ........................................... 34/545
  See application file for complete search history.

(56) References Cited

U.S. PATENT DOCUMENTS

| | | | |
|---|---|---|---|
| 2,302,711 A | | 11/1942 | Oglesby et al. |
| 2,776,654 A | * | 1/1957 | Johuston ............... F26B 23/02 126/110 B |
| 3,147,062 A | | 9/1964 | Glenn, Jr. |
| 3,633,281 A | * | 1/1972 | Vits .................. B65H 23/24 226/7 |
| 4,217,939 A | | 8/1980 | Yanagihara et al. |

(Continued)

FOREIGN PATENT DOCUMENTS

| | | |
|---|---|---|
| CN | 113758211 B | 11/2022 |
| JP | H08192089 A | 7/1996 |

(Continued)

OTHER PUBLICATIONS

Takahiko Nakano, U.S. Appl. No. 17/228,787, Notice of Allowance issued Jun. 8, 2023.

*Primary Examiner* — Stephen M Gravini
(74) *Attorney, Agent, or Firm* — Dickinson Wright, PLLC

(57) ABSTRACT

An electrode sheet drying apparatus includes a plurality of hot air blowers each having a nozzle. The nozzle has a first hot air guide having a first guide surface, a second hot air guide having a second guide surface. The nozzle is configured to blow band hot air toward an obliquely upstream side. An angle formed between the first guide surface and an undried active material layer is set to an angle at which the band hot air travels toward an upstream side along the undried active material layer over a distance longer than or equal to 15 times as large as a gap from a first upstream-side edge to the undried active material layer even without a spread prevention part.

1 Claim, 9 Drawing Sheets

(56) References Cited

U.S. PATENT DOCUMENTS

| | | | |
|---|---|---|---|
| 4,654,979 A * | 4/1987 | Candor | F26B 23/00 |
| | | | 34/254 |
| 5,575,082 A * | 11/1996 | Kishi | E03D 11/11 |
| | | | 34/247 |
| 5,775,002 A | 7/1998 | Iwase et al. | |
| 6,223,449 B1 | 5/2001 | Johnson et al. | |
| 6,725,565 B2 | 4/2004 | Harano et al. | |
| 6,920,704 B1 * | 7/2005 | Silverbrook | B41J 15/042 |
| | | | 34/454 |
| 7,040,038 B1 | 5/2006 | Beaumont | |
| 8,061,055 B2 | 11/2011 | Seidl et al. | |
| 8,950,083 B2 | 2/2015 | Fujiwara | |
| 9,127,884 B2 * | 9/2015 | Ciaschi | F26B 21/004 |
| 9,423,180 B2 * | 8/2016 | Pinches | F26B 17/282 |
| 9,651,303 B2 * | 5/2017 | Vinyard | F27B 9/16 |
| 9,765,480 B2 | 9/2017 | Schmit et al. | |
| 9,908,342 B1 | 3/2018 | Boland et al. | |
| 9,976,570 B2 * | 5/2018 | Hino | F04B 17/03 |
| 10,199,635 B2 | 2/2019 | Ho et al. | |
| 10,477,695 B2 * | 11/2019 | Utsumi | F26B 21/004 |
| 10,486,211 B2 * | 11/2019 | Liu | B29D 30/0643 |
| 10,518,558 B1 * | 12/2019 | Izawa | B41J 11/0022 |
| 10,919,321 B2 * | 2/2021 | Kawarada | F26B 13/10 |
| 11,117,393 B2 * | 9/2021 | Nishimura | B41J 11/0022 |
| 11,384,980 B2 * | 7/2022 | Triglia, Jr. | F26B 13/008 |
| 11,788,789 B2 * | 10/2023 | Nakano | F26B 3/04 |
| | | | 34/545 |
| 2015/0255780 A1 | 9/2015 | Tsuchiya | |
| 2021/0381764 A1 | 12/2021 | Nakano | |
| 2023/0417484 A1 * | 12/2023 | Nakano | F26B 15/18 |

FOREIGN PATENT DOCUMENTS

| | | | | |
|---|---|---|---|---|
| JP | 2013068394 A | 4/2013 | | |
| JP | 2013083404 A | 5/2013 | | |
| JP | 2013108702 A | 6/2013 | | |
| JP | 2015011964 A | 1/2015 | | |
| JP | 2020041774 A | 3/2020 | | |
| JP | 2021190368 A | 12/2021 | | |
| JP | 7396207 B2 * | 12/2023 | | F26B 13/103 |
| WO | 2014/049692 A1 | 4/2014 | | |

\* cited by examiner

ELECTRODE SHEET DRYING APPARATUS

CROSS-REFERENCE TO RELATED APPLICATION

This application is a continuation of U.S. patent application Ser. No. 17/228,787, filed Apr. 13, 2023, which claims priority to Japanese Patent Application No. 2020-096701 filed on Jun. 3, 2020, incorporated herein by reference in its entirety.

BACKGROUND

1. Technical Field

The present disclosure relates to an electrode sheet drying apparatus that heats and dries an undried active material layer provided on a band current collector foil in an undried electrode sheet with hot air while conveying the undried electrode sheet in a longitudinal direction of the undried electrode sheet.

2. Description of Related Art

A band electrode sheet in which a band active material layer provided on a band current collector foil extends in the longitudinal direction of the current collector foil is known as an electrode sheet used as a positive electrode sheet or negative electrode sheet of a battery or capacitor. Such a band electrode sheet is manufactured by, for example, the following technique. An active material paste containing active material particles and the like dispersed in a dispersion medium is prepared, and then the active material paste is applied onto a current collector foil to form a band undried electrode sheet in which a band undried active material layer is provided on the current collector foil. After that, the undried electrode sheet is conveyed into an electrode sheet drying apparatus, and hot air is blown onto the undried active material layer while the undried electrode sheet is being conveyed in the longitudinal direction inside the electrode sheet drying apparatus. Thus, the undried active material layer is heated and dried, and an active material layer is formed. For example, Japanese Unexamined Patent Application Publication No. 2013-068394 (JP 2013-068394 A) is an existing technique related to such an electrode sheet drying apparatus.

An electrode sheet drying apparatus 900 described in JP 2013-068394 A includes a plurality of hot air blowers 930 inside (see FIG. 9). The hot air blowers 930 each are located in a first thickness direction GH1 (upward in FIG. 9) with respect to an undried electrode sheet 1A. The first thickness direction GH1 is directed from a current collector foil 3 toward an undried active material layer 5x in a thickness direction GH of the undried electrode sheet 1A. The hot air blowers 930 are arranged in a conveying direction CH (longitudinal direction EH) at a predetermined pitch. Each of the hot air blowers 930 includes a reservoir main body 931, and a nozzle 933. The reservoir main body 931 defines a reservoir space for temporarily holding hot air HAb. The nozzle 933 blows the hot air HAb in the reservoir main body 931 toward an obliquely upstream side IH (a second thickness direction GH2 opposite from the first thickness direction GH1 in the thickness direction GH and an upstream side CH1 in the conveying direction CH, and, in FIG. 9, a lower left direction) as band hot air HA.

The reservoir main body 931 has a rectangular parallelepiped box shape. The reservoir main body 931 has a first wall 931a located in the first thickness direction GH1, a second wall 931b located in the second thickness direction GH2, an upstream-side wall 931c located on the upstream side CH1 in the conveying direction CH, a downstream-side wall 931d located on a downstream side CH2 in the conveying direction CH, a width-side wall (not shown) located on the near side of the drawing sheet in FIG. 9, and a width-side wall 931f located on the far side of the drawing sheet in FIG. 9. On the other hand, the nozzle 933 is provided on the downstream side CH2 of the second wall 931b and in the second thickness direction GH2 with respect to the downstream-side wall 931d. The nozzle 933 extends in a width direction FH (in FIG. 9, the direction perpendicular to the drawing sheet) of the undried electrode sheet 1A. The nozzle 933 blows band hot air HA wide in the width direction FH toward the obliquely upstream side IH.

In each of the thus configured hot air blowers 930, the second wall 931b of the reservoir main body 931 is present on the upstream side CH1 of the nozzle 933, so the band hot air HA blown out from the nozzle 933 is prevented by the second wall 931b from spreading in the first thickness direction GH1. In other words, the second wall 931b of the reservoir main body 931 serves as a spread prevention part that prevents the spread of blown band hot air HA in the first thickness direction GH1. Then, the band hot air HA passing through the clearance between the second wall (spread prevention part) 931b and the undried active material layer 5x of the undried electrode sheet 1A further travels along the undried active material layer 5x toward the upstream side CH1. In this way, by allowing the band hot air HA to flow along the undried active material layer 5x toward the upstream side CH1, it is possible to efficiently dry the undried active material layer 5x.

SUMMARY

However, the hot air blower 930 has the second wall (spread prevention part) 931b on the upstream side CH1 of the nozzle 933, so the overall size Lb of the hot air blower 930 in the conveying direction CH is large. For this reason, in arranging the hot air blowers 930 in the conveying direction CH, the flexibility of arrangement of the hot air blowers 930 is low. In other words, when the hot air blowers 930 are arranged in the conveying direction CH to successively blow the band hot air HA onto the undried active material layer 5x to quickly dry the undried active material layer 5x, the gap between any adjacent hot air blowers 930 needs to be widened; however, this leads to an increase in the size of the electrode sheet drying apparatus 900 in the conveying direction.

The disclosure provides an electrode sheet drying apparatus with a high flexibility of arrangement of hot air blowers, for example, with a reduced size in a conveying direction while a plurality of hot air blowers is arranged in the conveying direction.

An aspect of the disclosure provides an electrode sheet drying apparatus that heats and dries an undried active material layer provided on a band current collector foil in an undried electrode sheet while conveying the undried electrode sheet in a longitudinal direction of the undried electrode sheet. The electrode sheet drying apparatus includes a plurality of hot air blowers each located in a first thickness direction with respect to the undried electrode sheet. The first thickness direction is directed from the current collector foil toward the undried active material layer in a thickness direction of the undried electrode sheet. The plurality of hot air blowers is arranged in a conveying direction of the undried electrode sheet at a predetermined pitch. Each of the hot air blowers includes a nozzle configured to blow band hot air in a second thickness direction opposite from the first thickness direction and toward an obliquely upstream side that is an upstream side in the conveying direction. The band hot air spreads in a width direction of the undried electrode sheet. The nozzle includes a first hot air guide having a first guide surface that advances in the first thickness direction toward a downstream side in the conveying direction, and a second hot air guide located in the second thickness direction with respect to the first guide surface and having a second guide surface facing and parallel to the first guide surface. The nozzle is configured to blow the band hot air toward the obliquely upstream side from between a first upstream-side edge that is an edge at the upstream side of the first guide surface and a second upstream-side edge that is an edge at the upstream side of the second guide surface through between the first guide surface and the second guide surface. An angle formed between the first guide surface or the second guide surface and the undried active material layer is set to an angle at which the blown band hot air travels toward the upstream side along the undried active material layer over a distance longer than or equal to 15 times as large as a gap from the first upstream-side edge to the undried active material layer even without a spread prevention part that prevents spread of the band hot air in the first thickness direction being provided at the upstream side of the nozzle.

In the above-described electrode sheet drying apparatus, band hot air blown from the nozzle of each hot air blower toward the obliquely upstream side travels toward the upstream side in the conveying direction along the undried active material layer over a long distance, specifically, a distance longer than or equal to 15 times as large as the above-described gap. Therefore, it is possible to efficiently dry the undried active material layer. Moreover, each hot air blower does not need a spread prevention part that prevents spread of band hot air in the first thickness direction (direction away from the undried active material layer) on the upstream side of the nozzle. Therefore, in comparison with a hot air blower having a spread prevention part, the overall size of the hot air blower in the conveying direction is reduced. For this reason, the flexibility of arrangement of hot air blowers is increased, for example, the size of the electrode sheet drying apparatus in the conveying direction is reduced by arranging the plurality of hot air blowers at a narrow pitch.

Examples of a band electrode sheet formed by drying the undried electrode sheet include an electrode sheet used for batteries, such as lithium ion secondary batteries, and an electrode sheet used for capacitors, such as lithium ion capacitors. The electrode sheet may be a positive electrode sheet that makes up a positive electrode or a negative electrode sheet that makes up a negative electrode.

Examples of the undried active material layer include a band undried active material layer provided on a band current collector foil and extending in a longitudinal direction of the current collector foil, and an undried active material layer in such a form that a plurality of undried active material layers is arranged in the longitudinal direction at a predetermined pitch. The undried active material layer may also be an undried active material layer formed by applying an active material paste containing active material particles and the like dispersed in a dispersion medium onto a current collector foil, or an undried active material layer formed in such a manner that an aggregate of wetting particles obtained by mixing active material particles and the like with a dispersion medium and granulating the mixture is prepared and then the particle aggregate is rolled and transferred onto a current collector foil.

The phrase "band hot air travels toward the upstream side along the undried active material layer over a distance" means the following. When the flow velocity distribution of band hot air in the thickness direction on the upstream side of the first upstream-side edge of the nozzle in the conveying direction is obtained, band hot air travels toward the upstream side over the distance while maintaining the flow velocity distribution in which the flow velocity of band hot air decreases as a point advances in the first thickness direction (as a point shifts away from the undried active material layer); conversely, the flow velocity distribution in which the flow velocity of band hot air increases as a point advances in the second thickness direction (as a point approaches the undried active material layer), except for a near-surface region within 1 mm from the surface of the undried active material layer in the first thickness direction.

In the electrode sheet drying apparatus, the angle may fall within a range from 5° to 45°, the gap may fall within a range from 3 mm to 10 mm, and an initial flow velocity of the band hot air blown from the nozzle may fall within a range from 40 m/s to 80 m/s.

In the electrode sheet drying apparatus, the angle formed between the undried active material layer and each of the first guide surface and second guide surface of the nozzle falls within a range from 5° to 45°, the gap from the first upstream-side edge of the nozzle to the undried active material layer falls within a range from 3 mm to 10 mm, and the initial flow velocity of the band hot air falls within a range from 40 m/s to 80 m/s. With this configuration, band hot air blown from the nozzle tends to flow toward the upstream side along the undried active material layer over a long distance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
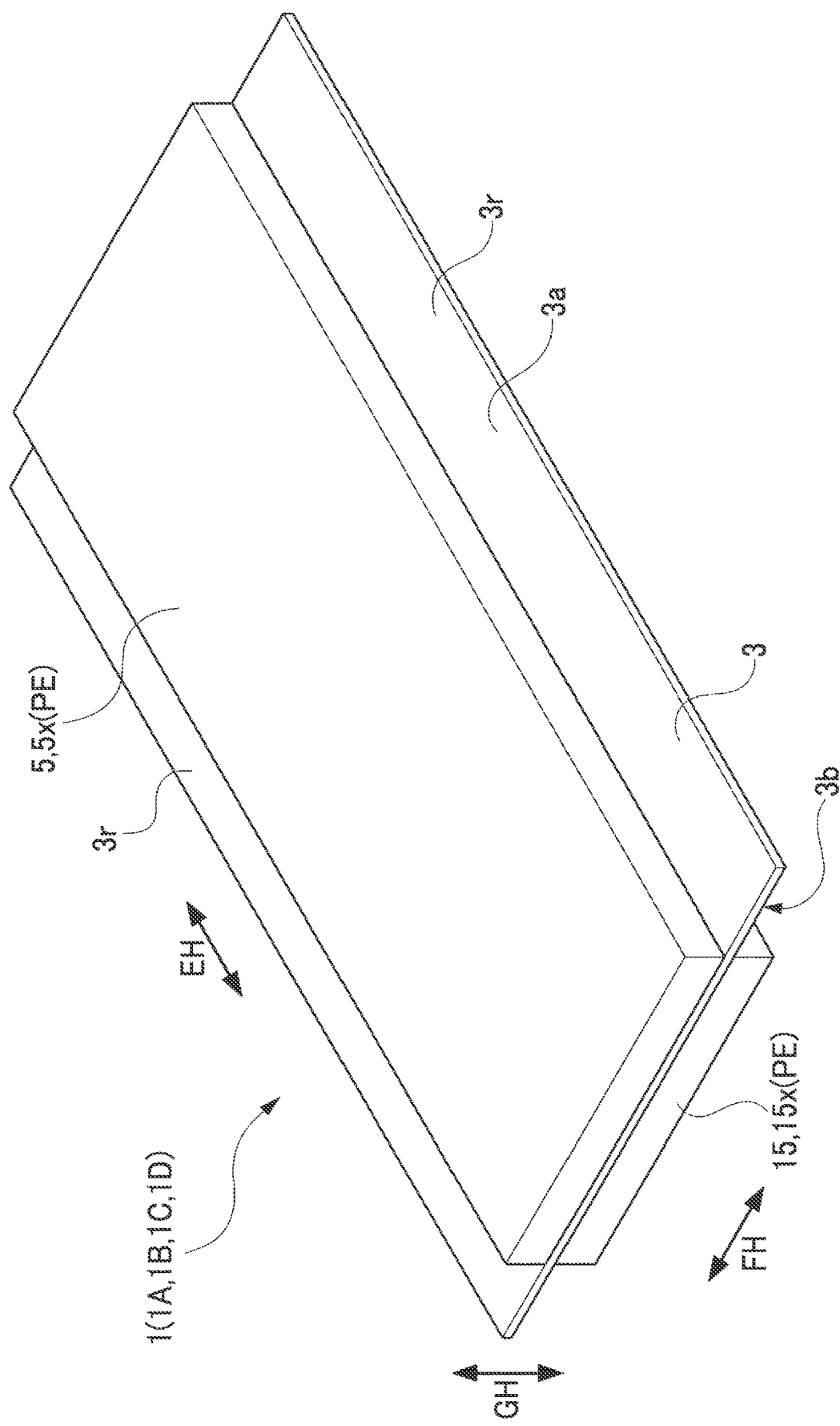
FIG. 1 is a perspective view of a band electrode sheet according to an embodiment.
Figure 2:
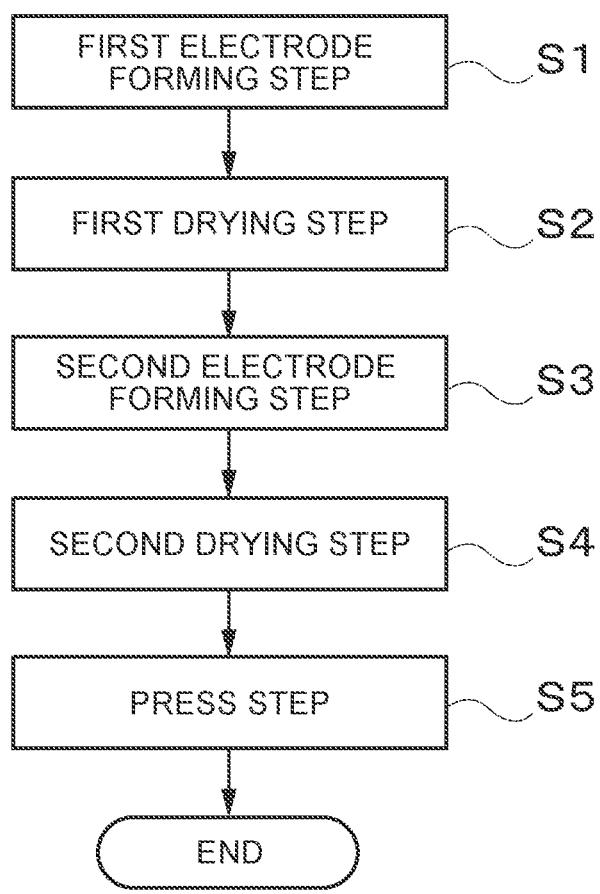
FIG. 2 is a flowchart of a manufacturing method for the band electrode sheet according to the embodiment.

Hereinafter, an embodiment of the disclosure will be described with reference to the accompanying drawings. FIG. 1 is a perspective view of a band electrode sheet 1 according to the present embodiment. The band electrode sheet 1 is used to manufacture square sealed lithium ion secondary batteries that are mounted on vehicles, such as hybrid vehicles, plug-in hybrid vehicles, and electric vehicles, and other devices. Specifically, the band electrode sheet 1 is a band positive electrode sheet used to manufacture a flat wound or stacked electrode assembly that is a component of a battery. Hereinafter, description will be made on the assumption that the longitudinal direction EH, width direction FH, and thickness direction GH of the band electrode sheet 1 are defined as the directions shown in FIG. 1.

The band electrode sheet 1 includes a current collector foil 3 made from a band aluminum foil extending in the longitudinal direction EH. On a first main surface 3a of the current collector foil 3, an active material layer 5 is provided in a band shape in the longitudinal direction EH in an area extending in the longitudinal direction EH in the middle in the width direction FH. On an opposite-side second main surface 3b of the current collector foil 3, an active material layer 15 is provided in a band shape in the longitudinal direction EH also in an area extending in the longitudinal direction EH in the middle in the width direction FH. The active material layers 5, 15 each are not provided on portions extending in the longitudinal direction EH at both ends in the width direction FH on the current collector foil 3. The portions extending in the longitudinal direction EH at both ends in the width direction FH are exposed portions 3r from which the current collector foil 3 is exposed in the thickness direction GH. The active material layers 5, 15 are made up of active material particles, electrically conductive particles, and a binder. In the present embodiment, lithium transition metal composite oxide particles, specifically, lithium nickel cobalt manganese oxide particles, are used as active material particles. Acetylene black (AB) particles are used as electrically conductive particles. Polyvinylidene difluoride (PVDF) is used as a binder.

Next, a manufacturing method for the band electrode sheet 1 will be described (see FIG. 2 to FIG. 6). Initially, in first electrode forming step S1 (see FIG. 2), an undried one-side electrode sheet (undried electrode sheet) 1A having a band undried active material layer 5x that will be the active material layer 5 after being dried is formed on the first main surface 3a of the current collector foil 3. Specifically, in advance of performing the first electrode forming step S1, an electrode paste PE is prepared in advance. The electrode paste PE is formed by mixing active material particles, electrically conductive particles, a binder, and a dispersion medium (in the present embodiment, N-methyl pyrrolidone (NMP)) and dispersing the active material particles, the electrically conductive particles, and the binder in the dispersion medium. The electrode paste PE has a solid content concentration NV of 62.5 wt % in the present embodiment.

In the first electrode forming step S1, the undried active material layer 5x is formed by applying the electrode paste PE onto the first main surface 3a of the current collector foil 3. Specifically, the current collector foil 3 unwound from an unwind roll (not shown) is conveyed in the longitudinal direction EH by a plurality of conveyance rolls (not shown). Then, the undried active material layer 5x is continuously formed in a band shape on the first main surface 3a of the current collector foil 3 by discharging the electrode paste PE in a predetermined amount from a coating die (not shown) to a middle part in the width direction FH on the first main surface 3a of the current collector foil 3. The undried active material layer 5x has a thickness t of 60 μm in the present embodiment.

Subsequently, in first drying step S2 (see FIG. 2), the undried active material layer 5x is heated and dried with band hot air HA while the undried one-side electrode sheet 1A obtained in the first electrode forming step S1 is being conveyed in the longitudinal direction EH. Thus, the active material layer 5 is formed. The first drying step S2 is performed by using the electrode sheet drying apparatus 100 (see FIG. 3 to FIG. 6). The electrode sheet drying apparatus 100 is made up of a drying chamber 110, a plurality of conveyance rolls 120 that convey the undried one-side electrode sheet 1A, a plurality of hot air blowers 130 that blow band hot air HA toward the undried one-side electrode sheet 1A, a duct 150 that guides hot air HAb to the hot air blowers 130, a hot air generating unit 160 that generates hot air HAb, and the like.

Figure 3:
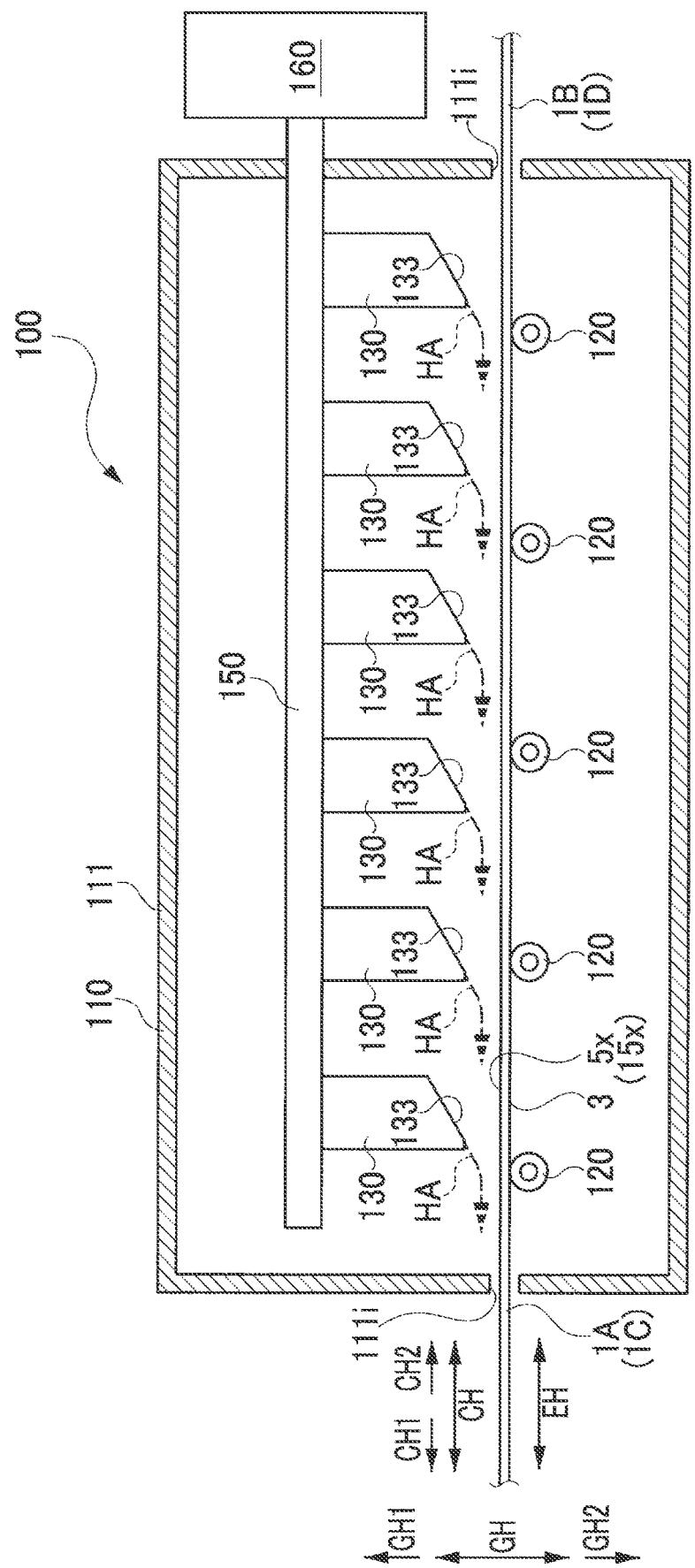
FIG. 3 is a diagram showing the whole of an electrode sheet drying apparatus according to the embodiment.
Figure 4:
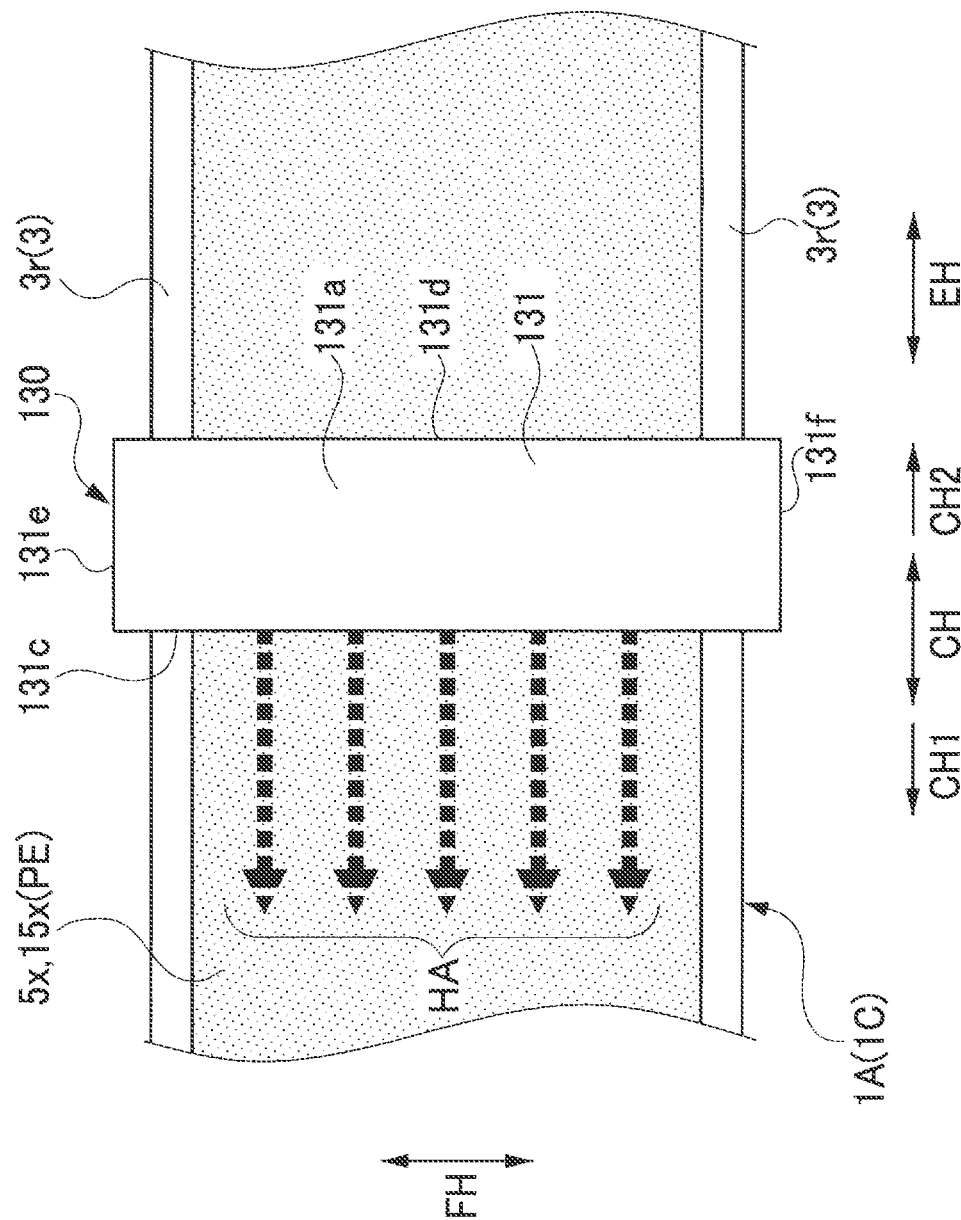
FIG. 4 is a plan view of a hot air blower and an undried one-side electrode sheet according to the embodiment when viewed from a side in a first thickness direction.
Figure 5:
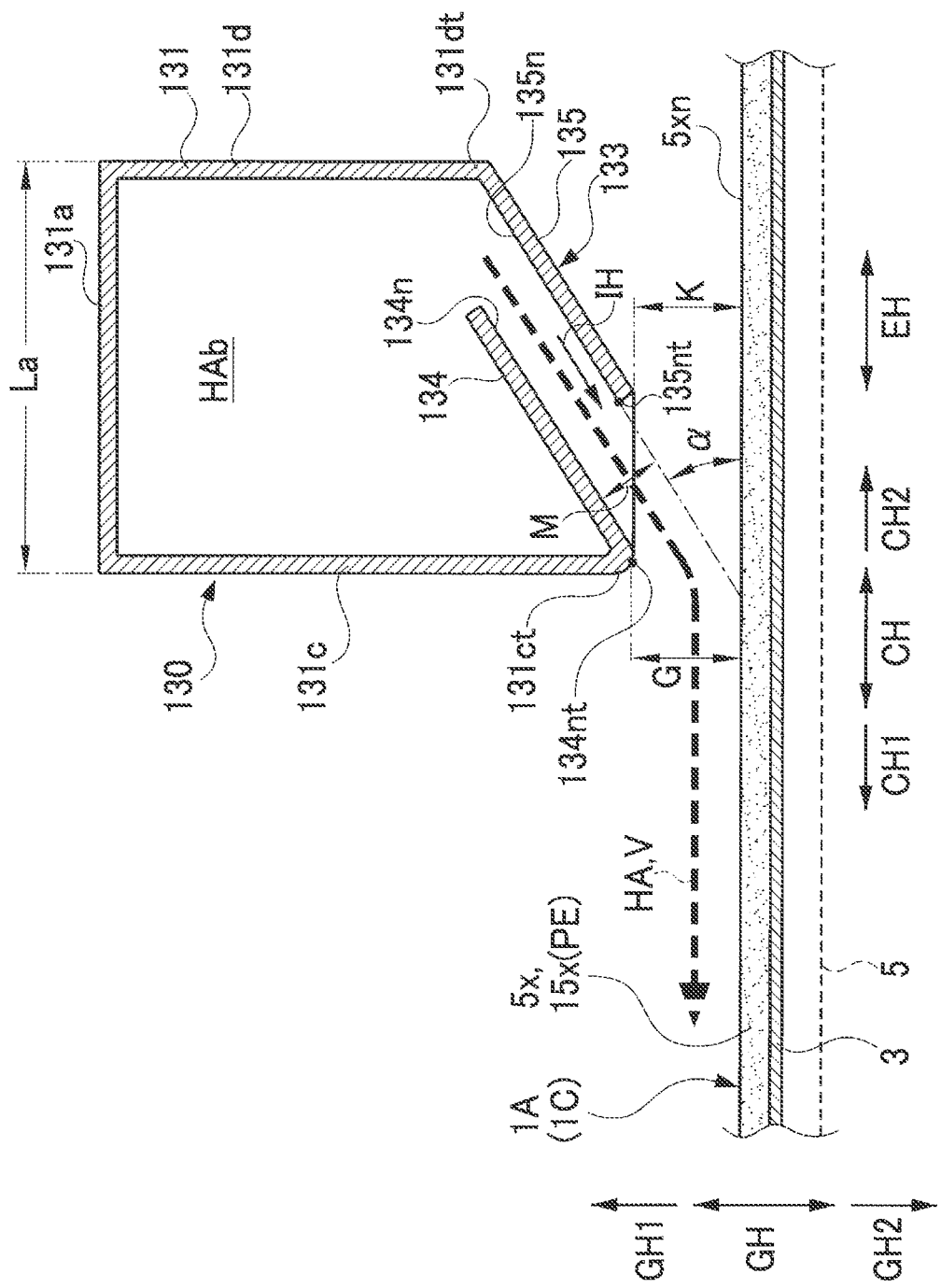
FIG. 5 is a cross-sectional view of the hot air blower and the undried one-side electrode sheet according to the embodiment when viewed in a width direction.
Figure 6:
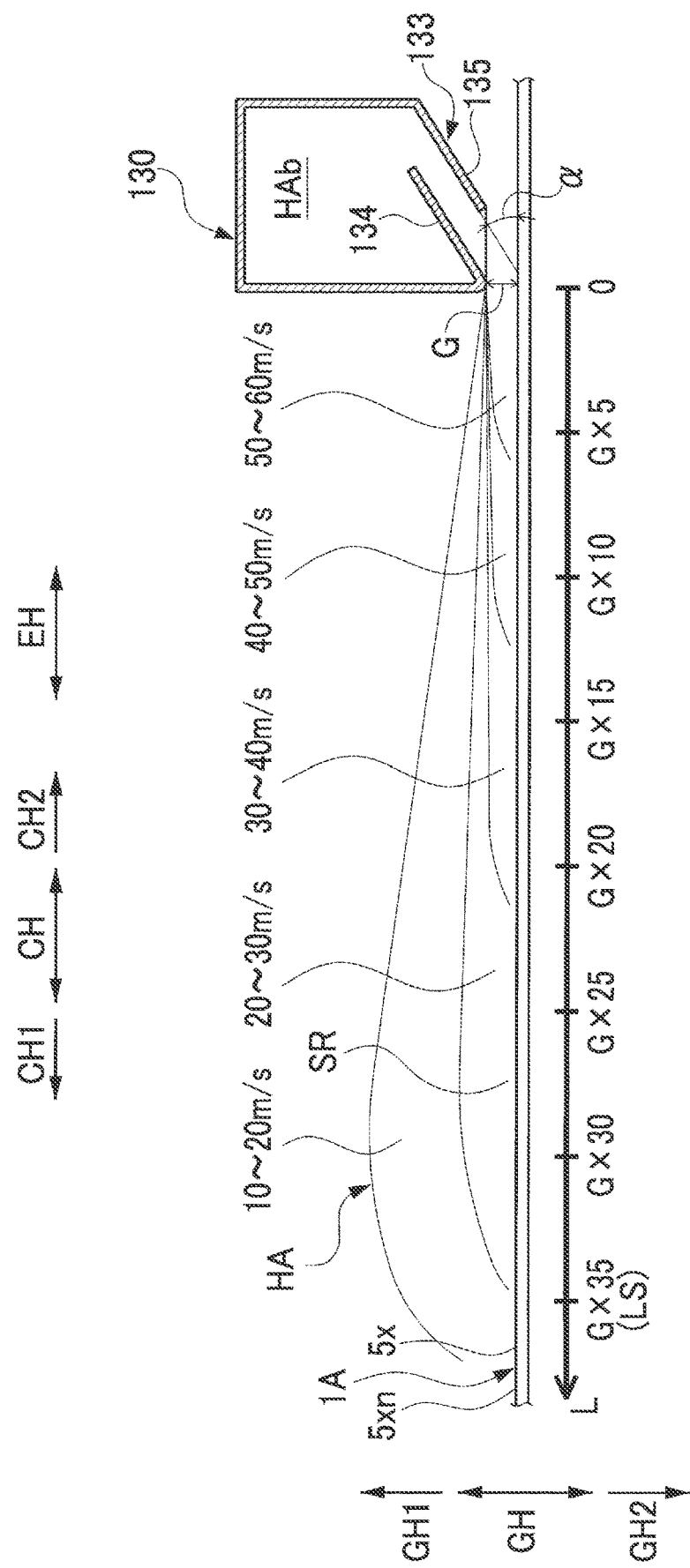
FIG. 6 is a diagram illustrating the flow velocity distribution of band hot air in a thickness direction according to the embodiment.

The drying chamber 110 (see FIG. 3) has a box shape isolated from the outside by a wall 111. The drying chamber 110 has a carry-in port 111i and a carry-out port 111j. The carry-in port 111i is used to convey the undried one-side electrode sheet 1A from the outside into the drying chamber 110. The carry-out port 111j is used to carry out a dried one-side electrode sheet 1B from the drying chamber 110 to the outside. The conveyance rolls 120 (see FIG. 3) are disposed in the drying chamber 110 and driven by a motor (not shown). The conveyance rolls 120 convey the undried one-side electrode sheet 1A in the longitudinal direction EH while being in contact with the current collector foil 3 of the undried one-side electrode sheet 1A. In each of FIG. 3 to FIG. 6, the right and left direction is the conveying direction CH, the left side is the upstream side CH1 of the conveying direction CH, and the right side is the downstream side CH2 of the conveying direction CH. In FIG. 3, FIG. 5, and FIG. 6, the upward direction is the first thickness direction GH1 from the current collector foil 3 toward the undried active material layer 5x in the thickness direction GH of the undried one-side electrode sheet 1A, and the downward direction is the second thickness direction GH2 opposite from the first thickness direction GH1 in the thickness direction GH.

The hot air blowers 130 (see FIG. 3 to FIG. 6) each are located in the first thickness direction GH1 with respect to the undried one-side electrode sheet 1A to be conveyed by the conveyance rolls 120 in the drying chamber 110 and are arranged in the conveying direction CH (longitudinal direction EH) at a predetermined pitch. Each of the hot air blowers 130 communicates with the duct 150 (described later) in the first thickness direction GH1 and connected to the hot air generating unit 160 (described later) via the duct 150. With this configuration, hot air HAb generated by the hot air generating unit 160 is once supplied to the hot air blowers 130 through the duct 150 and then blown to the outside as band hot air HA.

Each hot air blower 130 includes a reservoir main body 131 and a nozzle 133. The reservoir main body 131 defines a reservoir space for temporarily holding hot air HAb. The nozzle 133 blows the held hot air HAb to the outside as band hot air HA in a band shape. The reservoir main body 131 has a rectangular parallelepiped box shape and has a first wall

131*a*, an upstream-side wall 131*c*, a downstream-side wall 131*d*, a width-side wall 131*e*, and a width-side wall 131*f*. The first wall 131*a* of the reservoir main body 131 has a communication hole that communicates with the duct 150 (described later), and the communication hole is not shown in FIG. 4 to FIG. 6.

The first wall 131*a* is located in the first thickness direction GH1 and disposed parallel to the undried one-side electrode sheet 1A to be conveyed by the conveyance rolls 120 (disposed perpendicularly to the thickness direction GH). The upstream-side wall 131*c* is located at the upstream side CH1 in the conveying direction CH and disposed perpendicularly to the conveying direction CH. The downstream-side wall 131*d* is located at the downstream side CH2 in the conveying direction CH and disposed perpendicularly to the conveying direction CH. The width-side walls 131*e*, 131*f* are respectively located at both sides in the width direction FH of the undried one-side electrode sheet 1A and disposed perpendicularly to the width direction FH.

Each nozzle 133 is configured to blow band hot air HA spreading in the width direction FH of the undried one-side electrode sheet 1A toward an obliquely upstream side IH (in a lower left direction in FIG. 3, FIG. 5, and FIG. 6) that is the upstream side CH1 in the conveying direction CH and in the second thickness direction GH2. The nozzle 133 is provided on one side of the reservoir main body 131 in the second thickness direction GH2, and extends in the width direction FH. Specifically, the nozzle 133 is made up of a first hot air guide 134 and a second hot air guide 135 (see FIG. 5 and FIG. 6).

The first hot air guide 134 and the second hot air guide 135 each have a rectangular plate shape extending in the width direction FH and are disposed parallel to each other with a gap. The first hot air guide 134 extends from an end 131*ct* of the upstream-side wall 131*c* in the second thickness direction GH2 in a direction opposite from the obliquely upstream side IH (that is, in a right upper direction in FIG. 5 and FIG. 6) such that a point advances in the first thickness direction GH1 toward the downstream side CH2. In the present embodiment, a main surface of the first hot air guide 134, facing in the second thickness direction GH2, is a first guide surface 134*n*. In the first guide surface 134*n*, a point advances in the first thickness direction GH1 toward the downstream side CH2.

On the other hand, the second hot air guide 135 extends from an end 131*dt* of the downstream-side wall 131*d* in the second thickness direction GH2 toward the obliquely upstream side IH such that a point advances in the second thickness direction GH2 toward the upstream side CH1. In the present embodiment, a main surface of the second hot air guide 135, facing in the first thickness direction GH1, is a second guide surface 135*n*. The second guide surface 135*n* is located in the second thickness direction GH2 with respect to the first guide surface 134*n* and faces parallel to the first guide surface 134*n*.

An opening width M of the nozzle 133, perpendicular to the width direction FH and the direction directed toward the obliquely upstream side IH, is 5 mm in the present embodiment. A gap G from a first upstream-side edge 134 *nt* that is an edge of the first guide surface 134*n* at the upstream side CH1 to the undried active material layer 5*x* falls within a range from 3 mm to 10 mm (G=5 mm in the present embodiment). A gap K from a second upstream-side edge 135 *nt* that is an edge of the second guide surface 135*n* at the upstream side CH1 to the undried active material layer 5*x* is also 5 mm in the present embodiment.

An angle α formed between each of the first guide surface 134*n* and second guide surface 135*n* of the nozzle 133 and the undried active material layer 5*x* (hereinafter, also simply referred to as the angle α of the nozzle 133) falls within a range from 5° to 45° (α=30° in the present embodiment). In the present embodiment, the angle α of the nozzle 133 is set to an angle at which, even when a spread prevention part that prevents spread of band hot air HA in the first thickness direction GH1 is not provided on the upstream side CH1 of the nozzle 133, blown band hot air HA travels toward the upstream side CH1 along the undried active material layer 5*x* over the distance LS longer than or equal to 15 times as large as the gap G (G=5 mm in the present embodiment) (in the present embodiment, the distance LS is about 35 times as large as the gap G: LS=about 175 mm).

With the thus configured hot air blower 130, hot air HAb supplied into the reservoir main body 131 of the hot air blower 130 is blown as band hot air HA from between the first upstream-side edge 134 *nt* of the first guide surface 134*n* and the second upstream-side edge 135 *nt* of the second guide surface 135*n* toward the obliquely upstream side IH through between the first guide surface 134*n* and second guide surface 135*n* of the nozzle 133. An initial flow velocity Vs of the band hot air HA falls within a range from 40 m/s to m/s (Vs=60 m/s in the present embodiment). The blown band hot air HA travels toward the upstream side CH1 along the undried active material layer 5*x* over a long distance L, that is, the distance LS of about 35 times as large as the gap G in the present embodiment.

FIG. 6 schematically shows the obtained results of the flow velocity distribution of the band hot air HA in the thickness direction GH. In FIG. 6, the flow velocity V of band hot air HA within a near-surface region SR 1 mm or less in the first thickness direction GH1 from a surface 5*xn* of the undried active material layer 5*x* is not shown. Band hot air HA blown from the nozzle 133 at an initial flow velocity Vs of 60 m/s gradually decreases its flow velocity V as the band hot air HA travels toward the upstream side CH1 in the conveying direction CH. The band hot air HA travels toward the upstream side CH1 over a distance LS of about 35 times as large as the gap G from the first upstream-side edge 134 *nt* of the nozzle 133 to the undried active material layer 5*x* (LS=G×35) while maintaining such a flow velocity distribution that the flow velocity V decreases as a point advances in the first thickness direction GH1 (as a point shifts away from the undried active material layer 5*x*). In this way, in the electrode sheet drying apparatus 100 of the present embodiment, although no spread prevention part that prevents spread of band hot air HA in the first thickness direction GH1 is provided on the upstream side CH1 of the nozzle 133, the band hot air HA travels toward the upstream side CH1 along the undried active material layer 5*x* over a long distance L, that is, a distance LS of about 35 times as large as the gap G in the present embodiment.

The duct 150 is a flow passage of hot air HAb, connecting the hot air blowers 130 and the hot air generating unit 160 (described later). The duct 150 is connected to each hot air blower 130 at the side of the hot air blower 130 in the first thickness direction GH1 in the drying chamber 110 and connected to the hot air generating unit 160 outside the drying chamber 110. Through the duct 150, hot air HAb generated by the hot air generating unit 160 is supplied to the hot air blowers 130. The hot air generating unit 160 is disposed outside the drying chamber 110 and communicates with the duct 150. The hot air generating unit 160 includes an air blower fan (not shown) and a heater (not shown). The hot air generating unit 160 is configured to generate hot air HAb by increasing the temperature of air flow generated by the air blower fan with the heater. In the present embodiment, it is assumed that the temperature of the hot air HAb is 180° C.

Next, the first drying step S2 using the electrode sheet drying apparatus 100 will be described. The undried one-side electrode sheet 1A is carried into the drying chamber 110 through the carry-in port 111i in a state where the undried active material layer faces in the first thickness direction GH1 and the current collector foil 3 faces in the second thickness direction GH2 and is conveyed in the longitudinal direction EH by the conveyance rolls 120 in the drying chamber 110. On the other hand, band hot air HA spreading in the width direction FH is blown toward the obliquely upstream side IH from the nozzles 133 of the hot air blowers 130 provided in the first thickness direction GH1 with respect to the undried one-side electrode sheet 1A.

The band hot air HA travels toward the upstream side CH1 along the undried active material layer 5x over the distance LS longer than or equal to 15 times as large as the gap G (G=5 mm in the present embodiment) from the first upstream-side edge 134 nt of the nozzle 133 to the undried active material layer 5x (in the present embodiment, the distance LS is about 35 times as large as the gap G: LS=about 175 mm). When such band hot air HA is blown from the nozzles 133 of the hot air blowers 130, the dispersion medium contained in the undried active material layer 5x vaporizes, and the dried active material layer 5 is continuously formed. A band electrode sheet in which the active material layer 5 is formed on the first main surface 3a of the current collector foil 3 is also referred to as one-side electrode sheet 1B. The one-side electrode sheet 1B is carried out to the outside of the drying chamber 110 through the carry-out port 111j of the drying chamber 110.

Subsequently, in second electrode forming step S3 (see FIG. 2), the one-side electrode sheet 1B is used, and an undried both-side electrode sheet (undried electrode sheet) 1C having a band undried active material layer 15x that will be the active material layer 15 after being dried is formed on the second main surface 3b of the current collector foil 3. Specifically, as in the case of the first electrode forming step S1, the undried active material layer 15x having a thickness t of 60 μm is continuously formed by applying an electrode paste PE onto the second main surface 3b of the current collector foil 3.

Subsequently, in second drying step S4 (see FIG. 2), as in the case of the first drying step S2, by using the electrode sheet drying apparatus 100 (see FIG. 3 to FIG. 6), the undried active material layer 15x is heated and dried with band hot air HA while the undried both-side electrode sheet 1C is being conveyed in the longitudinal direction EH. Thus, the active material layer 15 is formed. In the second drying step S4 as well, band hot air HA is blown toward the obliquely upstream side IH from the nozzles 133 of the hot air blowers 130. The band hot air HA also travels toward the upstream side CH1 along the undried active material layer 15x over the distance LS longer than or equal to 15 times as larger as the gap G (G=5 mm in the present embodiment) from the first upstream-side edge 134 nt of the nozzle 133 to the undried active material layer 15x (in the present embodiment, the distance LS is about 35 times as large as the gap G: LS=about 175 mm). A band electrode sheet in which the active material layer 5 is formed on the first main surface 3a of the current collector foil 3 and the active material layer 15 is formed on the second main surface 3b is also referred to as both-side electrode sheet 1D.

Subsequently, in press step S5 (see FIG. 2), by using a roll press machine (not shown), roll press is applied to the both-side electrode sheet 1D in the thickness direction GH while the both-side electrode sheet 1D is being conveyed in the longitudinal direction EH. Thus, the densities of the active material layers 5, 15 are increased. In this way, the band electrode sheet 1 (see FIG. 1) is provided.

Examples 1 to 3 and Comparative Examples 1 and 2

Next, the results of the tests carried out to examine the advantageous effects of the disclosure will be described. In the tests, the dry state of the active material layer 5 was obtained in the case where the angle α of the nozzle 133 of each hot air blower 130 (the angle α formed between each of the first guide surface 134n and the second guide surface 135n and the undried active material layer 5x) was set to a different angle in the electrode sheet drying apparatus 100 and the undried active material layer 5x was dried with hot air.

Figure 7:
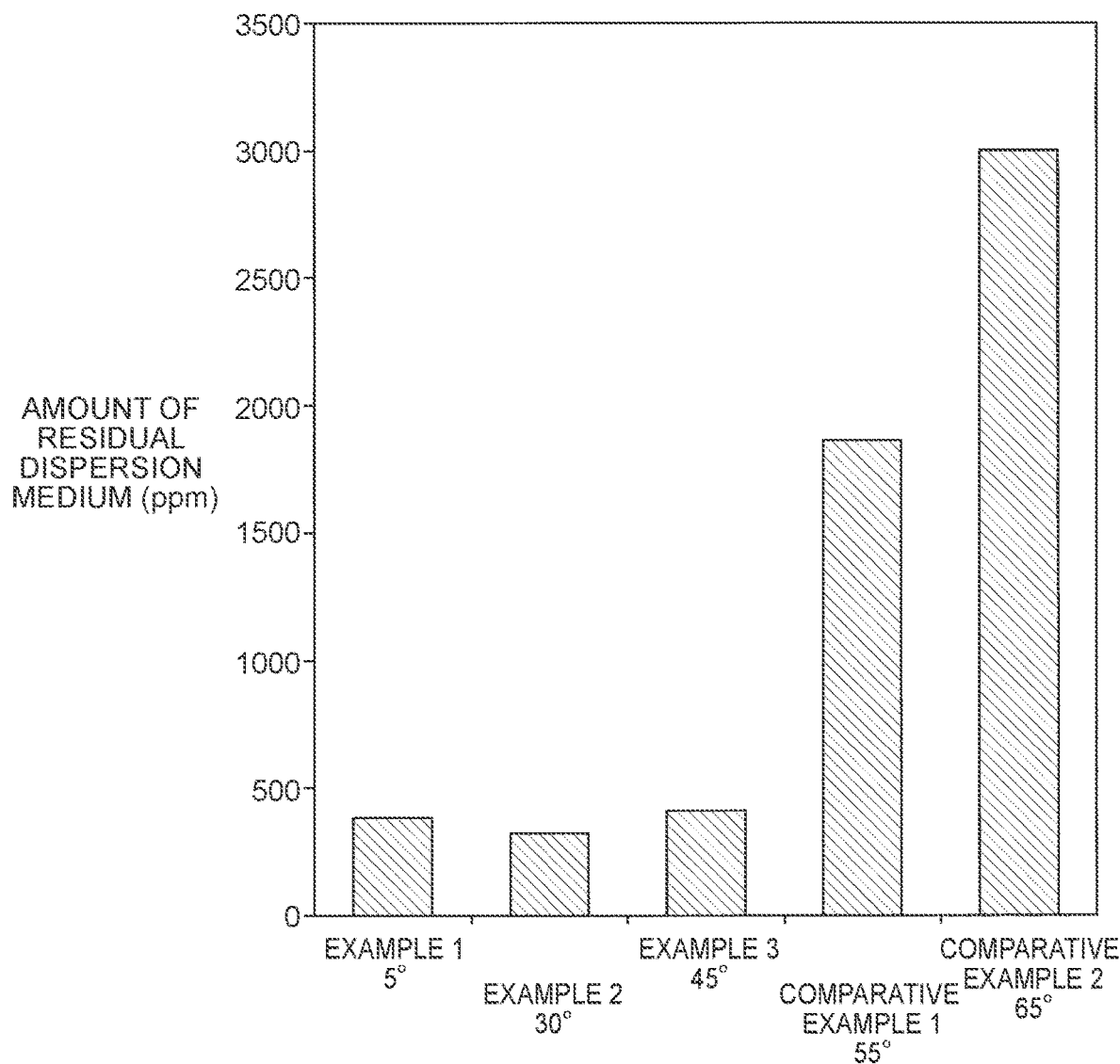
FIG. 7 is a graph showing the amount of residual dispersion medium remaining in an active material layer of each of one-side electrode sheets according to Examples 1 to 3 and Comparative Examples 1 and 2.

Specifically, as in the case of the above-described embodiment, the undried one-side electrode sheet 1A in which the undried active material layer 5x was provided on the current collector foil 3 was formed in the first electrode forming step S1, and then the active material layer 5 was formed by heating and drying the undried active material layer 5x with band hot air HA in the first drying step S2. At this time, the angle α of each nozzle 133 was set to 5° in Example 1, 30° in Example 2 as in the case of the embodiment, 45° in Example 3, 55° in Comparative Example 1, and 65° in Comparative Example 2 (see FIG. 7).

For each of Examples 1 to 3 and Comparative Examples 1 and 2, the flow velocity distribution of band hot air HA in the thickness direction GH was obtained. As a result, in Examples 1 to 3, substantially the flow velocity distribution shown in FIG. 6 was obtained. In each of Examples 1 to 3, band hot air HA traveled toward the upstream side CH1 over the distance LS longer than or equal to 15 times as large as the gap G from the first upstream-side edge 134 nt of each nozzle 133 to the undried active material layer 5x while maintaining such a flow velocity distribution that the flow velocity V of band hot air HA decreases as a point advances in the first thickness direction GH1 except for the near-surface region SR within 1 mm in the first thickness direction GH1 from the surface 5xn of the undried active material layer 5x. In other words, in Examples 1 to 3, band hot air HA traveled toward the upstream side CH1 along the undried active material layer 5x over the long distance LS longer than or equal to 15 times as large as the gap G.

Figure 8:
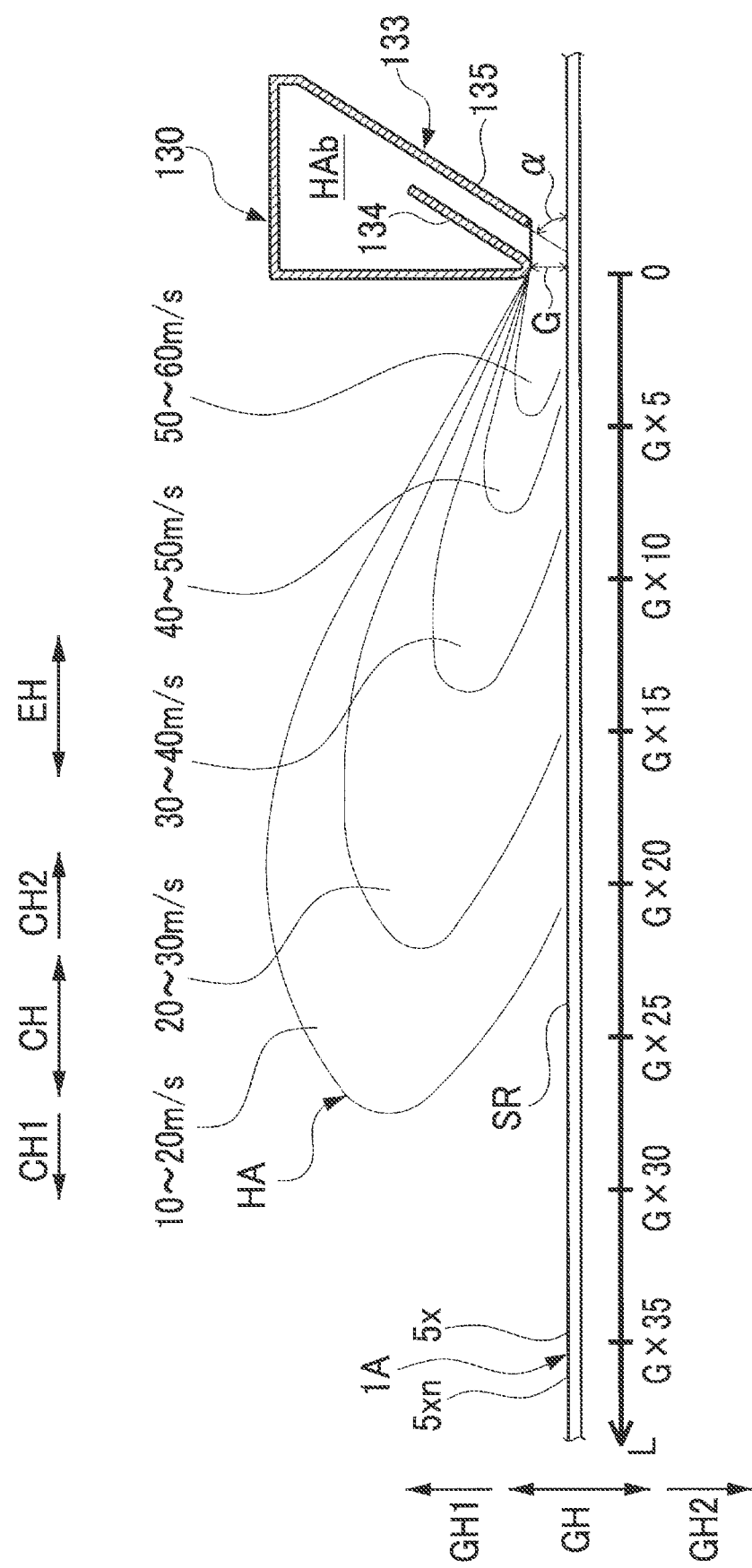
FIG. 8 is a diagram illustrating the flow velocity distribution of band hot air in the thickness direction according to the comparative examples.

On the other hand, in Comparative Examples 1 and 2, the flow velocity distributions shown in FIG. 8 were obtained. In each of Comparative Examples 1 and 2, part of band hot air HA, having the highest flow velocity V, significantly separated in the first thickness direction GH1 from the surface 5xn of the undried active material layer 5x before reaching the distance LS longer than or equal to 15 times as large as the gap G. Specifically, at, for example, an area of the distance L=G×10 in FIG. 8, part of the band hot air HA, having the highest flow velocity V of 30 m/s to 40 m/s, is separated in the first thickness direction GH1 from the undried active material layer 5x, and part of the band hot air HA, having a flow velocity of 20 m/s to 30 m/s lower than the velocity V of 30 m/s to 40 m/s, is present in the second thickness direction GH2 with respect to the part having a flow velocity of 30 m/s to 40 m/s. In this way, in Comparative Examples 1 and 2, band hot air HA did not travel toward the upstream side CH1 along the undried active material layer 5x over the long distance L.

Next, for each of the one-side electrode sheets 1B of Examples 1 to 3 and Comparative Examples 1 and 2, obtained in the first drying step S2, the amount (ppm) of residual dispersion medium remaining in the active material layer 5 was measured with gas chromatography. The results are shown by the graph in FIG. 7. As is apparent from the graph of FIG. 7, the amount of residual dispersion medium was less in Examples 1 to 3 than in Comparative Examples 1 and 2. The reason causing such results is presumed as follows.

In Examples 1 to 3, the flow velocity distributions of band hot air HA in the thickness direction GH each are substantially the flow velocity distribution shown in FIG. 6, and band hot air HA travels toward the upstream side CH1 along the undried active material layer 5x over the long distance LS longer than or equal to 15 times as large as the gap G. Therefore, it is possible to efficiently dry the undried active material layer 5x, so the amount of residual dispersion medium remaining in the active material layer 5 was small. In contrast, in Comparative Examples 1 and 2, the flow velocity distributions of band hot air HA in the thickness direction GH are the flow velocity distributions shown in FIG. 8, and band hot air HA cannot travel toward the upstream side CH1 along the undried active material layer 5x over the long distance L. Therefore, it is not possible to efficiently dry the undried active material layer 5x, so the amount of residual dispersion medium remaining in the active material layer 5 was large, so the active material layer 5 was presumably in a half-dried state.

As described above, in the electrode sheet drying apparatus 100, band hot air HA blown toward the obliquely upstream side IH from the nozzle 133 of each of the hot air blowers 130 travels toward the upstream side CH1 in the conveying direction CH along the undried active material layer 5x or the undried active material layer 15x over the long distance L, specifically, over the distance LS longer than or equal to 15 times as large as the gap G from the first upstream-side edge 134 nt of the nozzle 133 to the undried active material layer 5x or the undried active material layer 15x. Therefore, it is possible to efficiently dry the undried active material layer 5x or the undried active material layer 15x.

Figure 9:
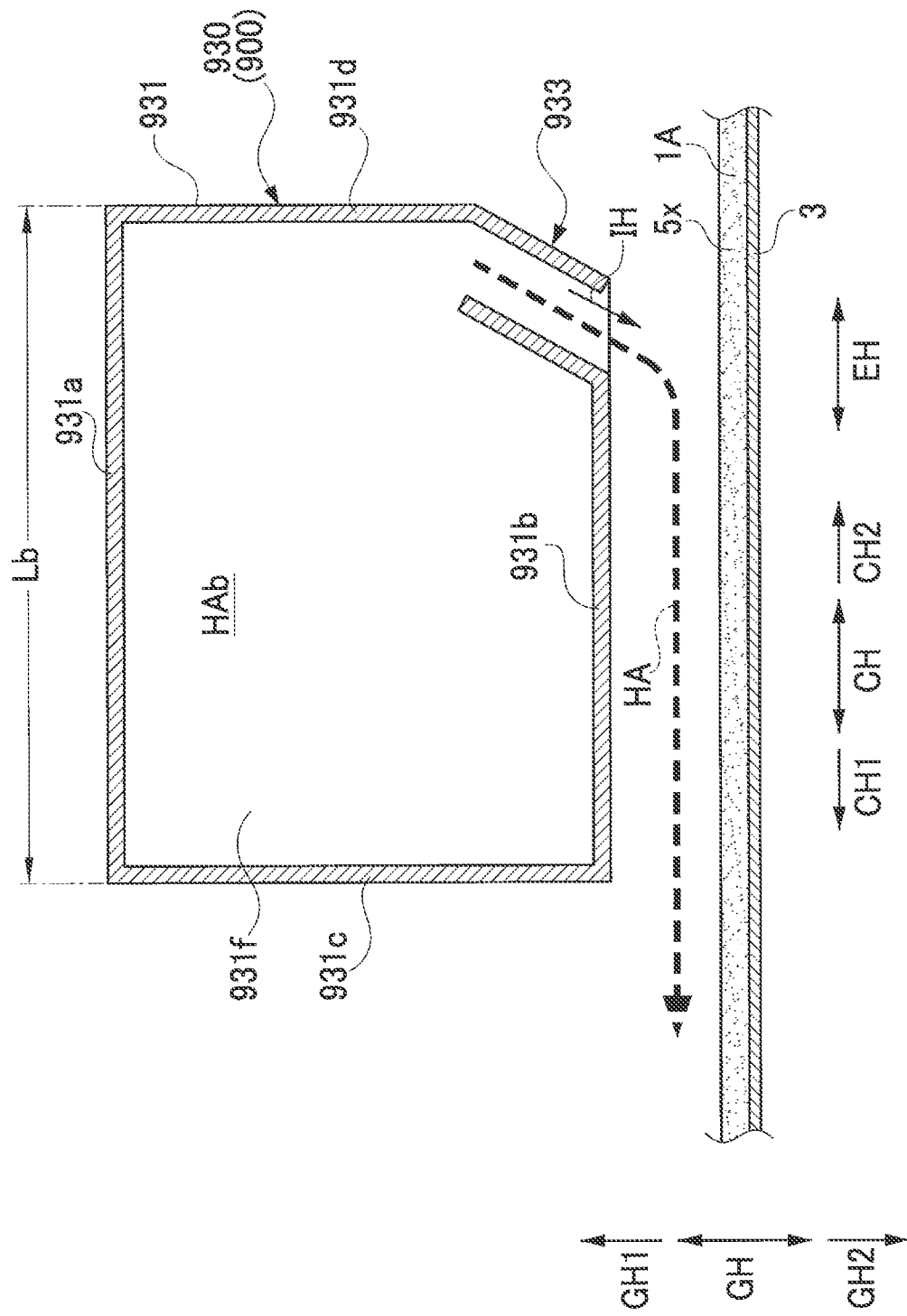
FIG. 9 is a cross-sectional view of a hot air blower and an undried electrode sheet according to an existing art when viewed in a width direction.

Moreover, each hot air blower 130 does not need a spread prevention part (for example, the second wall 931b in FIG. 9) that prevents the spread of band hot air HA in the first thickness direction GH1 (the direction to separate from the undried active material layer 5x) on the upstream side CH1 of the nozzle 133. Therefore, in comparison with a hot air blower having a spread prevention part (for example, the hot air blower 930 shown in FIG. 9), the size La (see FIG. 5) of the overall hot air blower 130 in the conveying direction CH is reduced. For this reason, the flexibility of arrangement of hot air blowers 130 is increased, for example, the size of the electrode sheet drying apparatus 100 in the conveying direction CH is reduced by arranging the plurality of hot air blowers 130 at a narrow pitch.

In addition, in the electrode sheet drying apparatus 100, the angle α (the angle α formed between each of the first guide surface 134n and the second guide surface 135n and the undried active material layer 5x) of each nozzle 133 is set to a value that falls within a range from 5° to 45°, the gap G from the first upstream-side edge 134nt of the nozzle 133 to the undried active material layer 5x or the undried active material layer 15x is set to a value that falls within a range from 3 mm to 10 mm, and the initial flow velocity Vs of band hot air HA is set to a value that falls within a range from 40 m/s to 80 m/s. With this configuration, band hot air HA blown from the nozzle 133 tends to flow toward the upstream side CH1 along the undried active material layer 5x or the undried active material layer 15x over the long distance L.

The disclosure is described based on the embodiment; however, the disclosure is not limited to the embodiment. Of course, the embodiment may be modified as needed without departing from the purport of the disclosure.

What is claimed is:

1. An electrode sheet drying apparatus that heats and dries an undried active material layer provided on a band current collector foil in an undried electrode sheet while conveying the undried electrode sheet in a longitudinal direction of the undried electrode sheet, the electrode sheet drying apparatus comprising:
   a plurality of hot air blowers each located in a first thickness direction with respect to the undried electrode sheet, the first thickness direction being directed from the current collector foil toward the undried active material layer in a thickness direction of the undried electrode sheet, the plurality of hot air blowers being arranged in a conveying direction of the undried electrode sheet at a predetermined pitch, wherein:
   each of the hot air blowers includes a nozzle configured to blow band hot air in a second thickness direction opposite from the first thickness direction in the thickness direction and toward an obliquely upstream side that is an upstream side in the conveying direction, the band hot air spreading in a width direction of the undried electrode sheet;
   the nozzle includes
      a first hot air guide having a first guide surface that advances in the first thickness direction toward a downstream side in the conveying direction, and
      a second hot air guide located in the second thickness direction with respect to the first guide surface and having a second guide surface facing and parallel to the first guide surface;
   the nozzle is configured to blow the band hot air toward the obliquely upstream side from between a first upstream-side edge that is an edge at the upstream side of the first guide surface and a second upstream-side edge that is an edge at the upstream side of the second guide surface through between the first guide surface and the second guide surface;
   an angle formed between the first guide surface or the second guide surface and the undried active material layer falls within a range from 5° to 45°;
   a gap from the first upstream-side edge to the undried active material layer falls within a range from 3 mm to 10 mm; and
   an initial flow velocity of the band hot air blown from the nozzle falls within a range from 40 m/s to 80 m/s.

* * * * *